United States Patent
Kim et al.

(10) Patent No.: US 9,674,451 B2
(45) Date of Patent: Jun. 6, 2017

(54) HIGH-SPEED AND HIGH-RESOLUTION PAN-TILT DEVICE CAPABLE OF CHANGING HEIGHT

(71) Applicant: KOREA RESEARCH INSTITUTE OF STANDARDS AND SCIENCE, Daejeon (KR)

(72) Inventors: Su Un Kim, Daejeon (KR); Man Yong Choi, Daejeon (KR); Jeong Hak Park, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days.

(21) Appl. No.: 14/889,386

(22) PCT Filed: Oct. 15, 2014

(86) PCT No.: PCT/KR2014/009678
§ 371 (c)(1),
(2) Date: Nov. 5, 2015

(87) PCT Pub. No.: WO2016/052792
PCT Pub. Date: Apr. 7, 2016

(65) Prior Publication Data
US 2016/0269647 A1    Sep. 15, 2016

(30) Foreign Application Priority Data

Sep. 30, 2014 (KR) .................. 10-2014-0130870

(51) Int. Cl.
*H04N 5/232* (2006.01)
*G08B 13/196* (2006.01)
(Continued)

(52) U.S. Cl.
CPC ....... *H04N 5/23296* (2013.01); *G03B 17/561* (2013.01); *G06K 9/00771* (2013.01);
(Continued)

(58) Field of Classification Search
CPC .... H04N 5/232; H04N 7/185; H04N 5/23254; H04N 5/23261; H04N 5/23264;
(Continued)

(56) References Cited

U.S. PATENT DOCUMENTS 5,627,616 A * 5/1997 Sergeant .......... G08B 13/19619
348/143
2003/0021598 A1* 1/2003 Higashiyama ..... G07C 9/00158
396/18
(Continued)

FOREIGN PATENT DOCUMENTS

| KR | 1020070092792 A | 9/2007 |
| KR | 1020110013655 A | 10/2011 |
| KR | 1020120016479 A | 2/2012 |
| KR | 1020120115831 A | 10/2012 |

OTHER PUBLICATIONS

International Search Report for PCT/KR2014/009678 dated Jun. 1, 2015.

*Primary Examiner* — Roberto Velez
*Assistant Examiner* — Tuan Le
(74) *Attorney, Agent, or Firm* — Hauptman Ham, LLP

(57) ABSTRACT

A high-speed and high-resolution pan-tilt device capable of changing a height comprises a pan unit, a tilt unit, a support bar, and a base frame. The pan unit includes a pan motor and a pan screw for rotating a camera leftward and rightward. The tilt unit includes a tilt motor and a tilt screw for rotating the camera upward and downward, and moves the entirety of the pan unit upward and downward. The support bar has a tip portion and a rear end portion. The camera is mounted on the tip portion, and is capable of being panned and tilted when an angle of the support bar is changed. The base frame supports the pan unit and the tilt unit.

11 Claims, 13 Drawing Sheets

(51) Int. Cl.
  *H04N 5/225* (2006.01)
  *H04N 7/18* (2006.01)
  *G03B 17/56* (2006.01)
  *G06K 9/00* (2006.01)

(52) U.S. Cl.
  CPC ..... *G08B 13/19617* (2013.01); *H04N 5/2252* (2013.01); *H04N 7/183* (2013.01)

(58) Field of Classification Search
  CPC ........... H04N 5/23277; H04N 5/23248; H04N 5/23296; H04N 5/2252; H04N 7/183; G06T 7/254; G06K 9/32; G06K 9/00771; G06K 9/209; G06K 2009/2045; G08B 13/19686; G08B 13/19617; G03B 17/561
  See application file for complete search history.

(56) References Cited

U.S. PATENT DOCUMENTS

| | | | |
|---|---|---|---|
| 2004/0047623 A1* | 3/2004 | Top | G08B 13/1963 396/427 |
| 2006/0203098 A1* | 9/2006 | Henninger | G06K 9/00771 348/211.99 |
| 2009/0303325 A1* | 12/2009 | Mizuno | G03B 3/10 348/143 |
| 2010/0119221 A1* | 5/2010 | Lundberg | H04N 5/247 396/427 |
| 2010/0141760 A1* | 6/2010 | Cheng | G08B 13/1963 348/143 |

* cited by examiner

HIGH-SPEED AND HIGH-RESOLUTION PAN-TILT DEVICE CAPABLE OF CHANGING HEIGHT

TECHNICAL FIELD

The present invention relates to a device associated with high-speed and high-precision control for a device for controlling a posture of a camera, and more particularly, to a device implemented to be capable of panning and tilting a camera mount device in a high-speed and high-precision manner and simultaneously moving vertically the camera mount device in an up and down direction along a surface of a column by using screws, motors, and bearings in order to implement a high speed and high precision of the device for panning and tilting the camera and adjust a height of the device for panning and tilting the camera.

BACKGROUND ART

Recently, various types of surveillance systems using cameras are widely used in industries, and the surveillance system using the cameras is actively utilized for security and monitoring.

Presently, most surveillance cameras for security, which capture images of a particular location and monitor a visitor or an intruder, are wide-range surveillance cameras that capture images of the entirety of a region to be monitored within a particular distance and a range of view angle.

Because the wide-range surveillance camera is a stationary camera that monitors a given large area, the wide-range surveillance camera has a limitation in terms of resolution. For this reason, a face of a person in a region to be monitored cannot be mostly recognized from the images captured by the wide-range surveillance camera.

Therefore, recently, a system having a camera, which dynamically tracks a person, is being developed.

Typically, to dynamically track and monitor people, vehicles, and objects at a long distance at the time of widely monitoring a large area, a panning function, a tilting function, and a zooming function are essentially required.

Here, the panning and tilting functions are carried out by a pan-tilt device, and the zooming function is carried out by a camera or a separate zoom lens mounted in the camera.

Various types of cameras for widely monitoring a large area are disclosed in Korean Patent Application Laid-Open Nos. 10-2010-0109125 and 10-2013-0002366 and the like.

In general, since an object to be monitored when monitoring a wide area is positioned at various positions from a short distance to a long distance and moves slowly or rapidly, a high-precision and high-speed change of an angle of the pan-tilt device are required to smoothly track the object.

For example, panning and tilting velocities for tracking an object, which is moving at a short distance from the camera, need to be high in terms of the speed and the precision, and high precision of panning and tilting angles is required to track an object that moves slowly at a long distance.

However, most of the presently developed pan-tilt devices cannot satisfy precision when a person moves 1 m at a running speed (10 m/s) at a long distance (100 m), and even though the pan-tilt device has an approximate function, the pan-tilt device is very expensive, and thus just used for military purpose or a special purpose.

A required function from another point of view is a function of adjusting a height, but the present surveillance camera is fixedly installed at a particular height, such that it is difficult to obtain data of a face of a person within a space to be monitored in a case in which the person wears a hat or the face is hidden by an umbrella or the like.

DISCLOSURE

Technical Problem

The present invention has been made in an effort to solve the above-described problems associated with the prior art, and an object of the present invention is to implement a new type of device for panning and tilting a camera, which is capable of panning and tilting the camera in a high-precision and high-speed manner by using a driving method using motors and screws, and capable of adjusting a height while moving along a rail, thereby providing a high-speed and high-resolution pan-tilt device which may ensure functionality for smoothly tracking an object to be monitored, which is positioned at various positions from a short distance to a long distance and moves slowly or rapidly, have a simple structure, and be inexpensive and excellent in terms of economic feasibility.

Technical Solution

A high-speed and high-resolution pan-tilt device capable of changing a height, which is provided in the present invention in order to achieve the above object, has the following characteristics.

The high-speed and high-resolution pan-tilt device has a structure including: a pan unit which includes a pan motor and a pan screw for rotating a camera leftward and rightward; a tilt unit which includes a tilt motor and a tilt screw for rotating the camera upward and downward, and moves the entirety of the pan unit upward and downward; a support bar which is a means for supporting the camera, and has a tip portion fixedly supported by a supporter by means of a bearing structure, and a rear end portion movably connected to a nut disposed on the pan screw by means of a bearing structure, in which an angle and a length of the support bar is changeable when the camera is panned and tilted; the camera which is mounted on the tip portion of the support bar, and is capable of being panned and tilted when an angle of the support bar is changed; and a base frame which supports the pan unit and the tilt unit.

Herein, the high-speed and high-resolution pan-tilt device may further include a vertical movement device which is a means for adjusting a height of the camera and is capable of vertically moving the entirety of the base frame including the camera, and the vertical movement device may include a rail that is vertically installed on a wall surface or a post, a main wheel that is installed on the base frame and rolls along the rail, and a wheel driving motor.

The vertical movement device may include a sub-wheel which is disposed at an opposite side to the main wheel and assists the vertical movement while rolling along the rail.

Further, the tilt unit may be a type in which the tilt unit is tilted at an upward angle in a horizontal state or a type in which the tilt unit is tilted at upward and downward angles in the horizontal state.

The tilt unit may include shaft supporters which are disposed in parallel at both sides of the tilt screw and guide the upward and downward movement of the pan unit while penetratively supporting both sides of the pan unit.

Further, the support bar may include a combination of a rod and a housing which is capable of changing a length of the support bar while being accommodated and withdrawn relative to each other in a longitudinal direction by means of a bearing.

In addition, the high-speed and high-resolution pan-tilt device may further include a housing which is made of a transparent material and accommodates the pan unit, the tilt unit, the support bar, and the camera, and covers a front side of the base frame.

Advantageous Effects

The high-speed and high-resolution pan-tilt device capable of changing a height, which is provided in the present invention, has the following advantages.

First, a tracking and surveillance camera tracks a target and captures enlarged images of the target by using high-precision and high-speed panning and tilting functions, thereby obtaining high-resolution images for identification.

Second, it is possible to capture images while changing a height of the camera, thereby solving a problem in that the target is not visible at an angle at which the camera is generally installed, and thus obtaining front face images for recognizing the face.

Third, by appropriately controlling a condition of a screw such as a width and inclination of threads, and a rotational speed of a motor, it is possible to ensure precise panning and tilting operations and panning and tilting velocities, and smoothly tract the object to be monitored which is positioned at various positions from a short distance to a long distance and moves slowly or rapidly.

Fourth, since rotational operations in an up and down direction and a left and right direction are implemented by using a motor-and-screw manner, and an operation of adjusting a height is implemented by using a wheel and a rail, the high-speed and high-resolution pan-tilt device has an overall simple structure and may be manufactured inexpensively, such that the high-speed and high-resolution pan-tilt device is advantageous in terms of maintenance and economic feasibility.

EXPLANATION OF REFERENCE NUMERALS AND SYMBOLS

Figure 1:
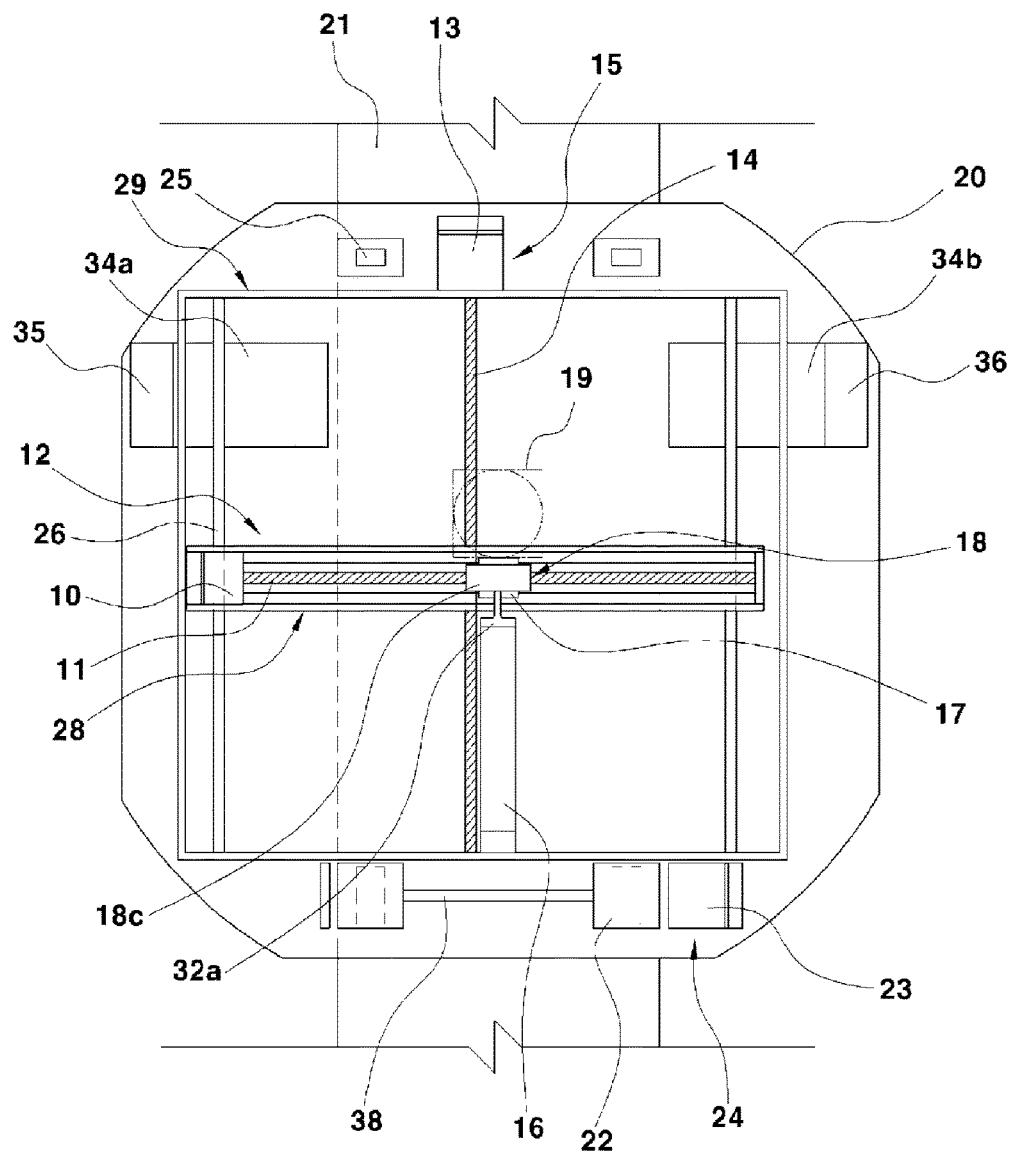
FIG. 1 is a front view illustrating a high-speed and high-resolution pan-tilt device according to an exemplary embodiment of the present invention.

10: pan motor
11: pan screw
12: pan unit
13: tilt motor
14: tilt screw
15: tilt unit
16: supporter
17: nut
18: support bar
18a: bearing
18b: rod
18c: housing
19: camera
20: base frame
21: rail
22: main wheel
23: wheel driving motor
24: vertical movement device
25: sub-wheel
26: shaft supporter
27: housing
28: pan base
29: wall
30: ball
31: ball groove
32a, 32b: bracket
33: slot
34a, 34b: PTU control board
35: power connector
36: PTU connector
37: rail plate
38: power transmission shaft
39: camera mount

BEST MODE

Hereinafter, the present invention will be described in detail with reference to the accompanying drawings.

Figure 2:
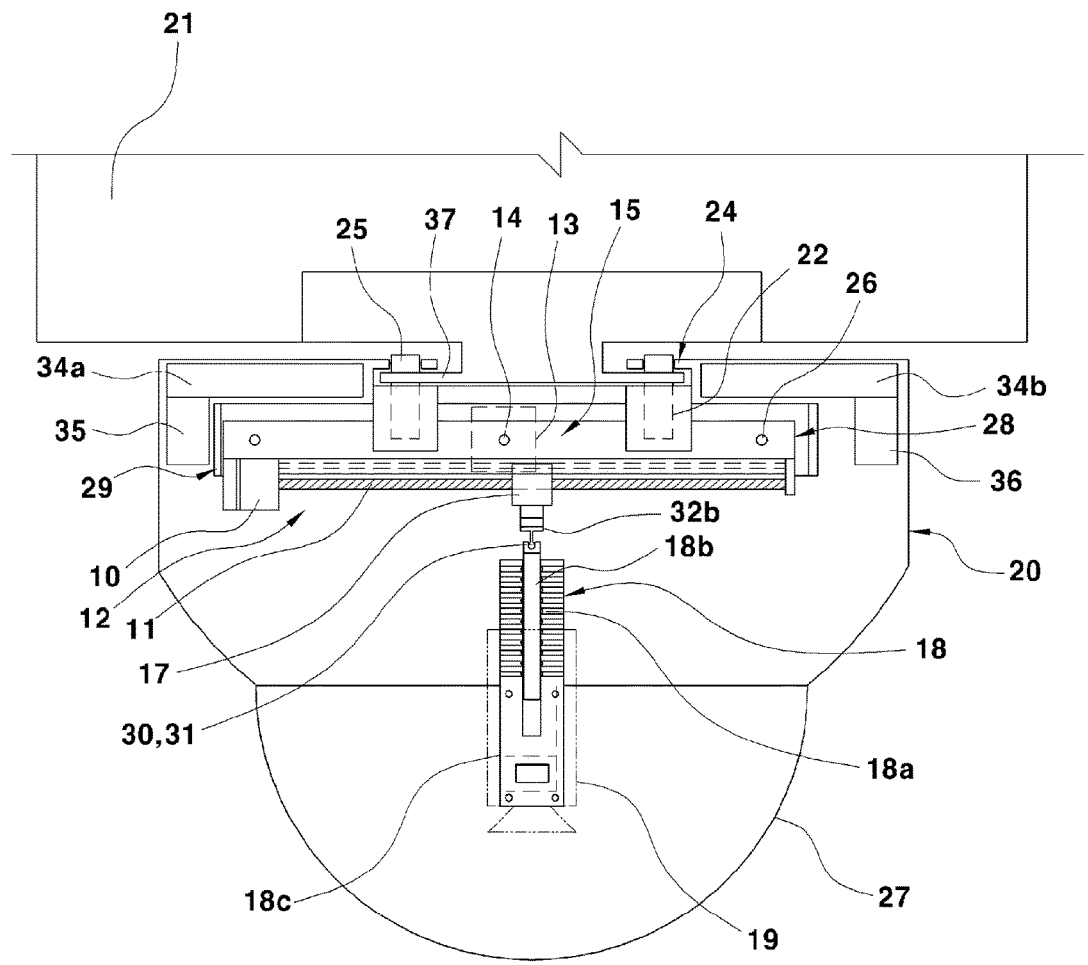
FIG. 2 is a top plan view illustrating the high-speed and high-resolution pan-tilt device according to the exemplary embodiment of the present invention.
Figure 3:
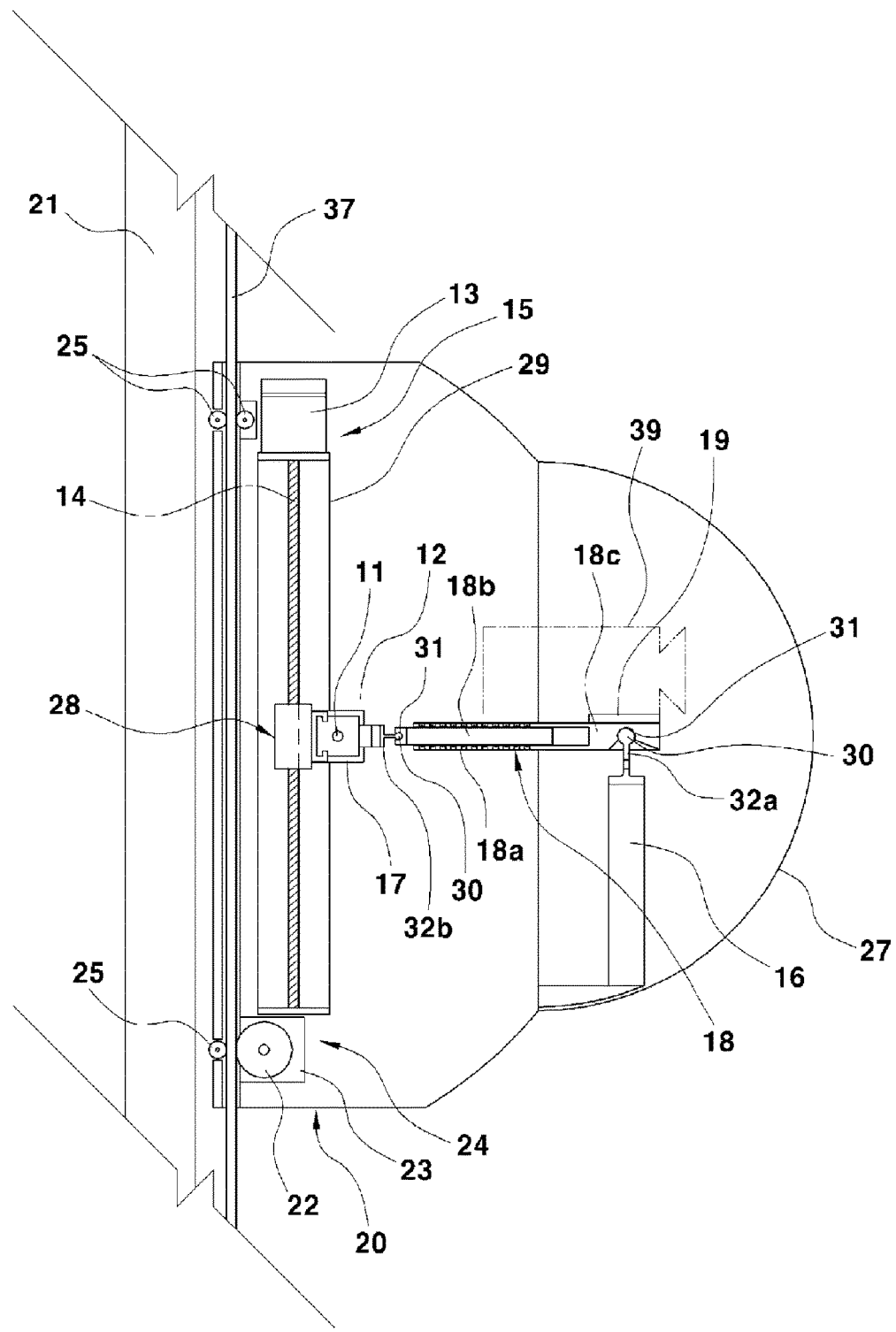
FIG. 3 is a side view illustrating the high-speed and high-resolution pan-tilt device according to the exemplary embodiment of the present invention.

FIGS. 1 to 3 are a front view, a top plan view, and a side view illustrating a high-speed and high-resolution pan-tilt device according to an exemplary embodiment of the present invention.

As illustrated in FIGS. 1 to 3, the pan-tilt device has a structure in which panning and tilting operations may be performed in a high-precision and high-speed manner, and an up/down height of the pan-tilt device is adjustable while the pan-tilt device moves along a rail. The pan-tilt device includes a pan unit 12 for adjusting a left/right rotation angle of a camera 19, a tilt unit 15 for adjusting an up/down rotation angle of the camera 19, and a vertical movement device 24 for adjusting a height of the camera 19.

The pan unit 12 is a mean for adjusting an angle of the camera 19 in a left/right direction, and has a structure that includes a pan motor 10 and a pan screw 11.

For example, a pan base 28, which has an elongated quadrangular plate shape having walls at both longitudinal ends thereof, is provided, the pan motor 10 is installed on one wall of the pan base 28, and the pan screw 11 is installed in parallel with the pan base 28 so that both ends of the pan screw 11 are supported between a shaft of the pan motor 10 and the other wall of the pan base 28 while being supported by bearings or the like.

The pan base 28, which includes the pan motor 10 and the pan screw 11, is disposed in parallel at a front side of a base frame 20 to be described below so as to have a left/right horizontal posture, and installed to be supported by a tilt screw 14 and shaft supporters 26 that will be described below.

Further, a nut 17 is installed on the pan screw 11, and in this case, the nut 17 is coupled to the pan screw 11 in a threaded connection manner or in a ball screw manner, such that when the pan screw is rotated, the nut 17 may be moved in a left and right direction along a screw shaft.

Here, a rear end portion of a support bar 18 to be described below is connected to the nut 17, and as a result, when the nut is moved, a position of the rear end portion of the support bar 18 may also be changed in the left and right direction.

The tilt unit 15 is a means for adjusting an angle of the camera 19 in an up and down direction, and has a structure that includes a tilt motor 13 and the tilt screw 14.

For example, the base frame 20, which has a quadrangular wall 29 and a roughly quadrangular plate shape, is provided, a tilt screw 14 is disposed at a front side of the base frame 20 so that the tilt screw 14 is vertically disposed in parallel with the up and down direction at a center position of a left/right width of the plate, and a shaft of the tilt motor 13 is connected to one end of the tilt screw 14.

In this case, the tilt motor 13 is installed to be supported on the wall 29 of the base frame 20, and both ends of the tilt screw 14 are supported between the shaft of the tilt motor 13 and the wall 29, such that the tilt screw 14 is rotatably installed.

In particular, the tilt screw 14 vertically penetrates a middle portion in a longitudinal direction of the pan base 28 that has a horizontal posture, and is coupled to the pan base 28 so as to transmit power in a screw manner, and accordingly, when the tilt screw 14 is rotated by the operation of the tilt motor 13, the pan base 28 may be moved upward and downward along the screw shaft by power transmission in a screw manner.

As the pan base 28 is moved upward and downward, the position of the rear end portion of the support bar 18, which is connected to the pan base through the nut 17, may also be changed in the up and down direction.

In addition, two shaft supporters 26 are provided as a means for guiding the upward and downward movement of the pan base 28 when the pan unit 12 is moved upward and downward, and in this case, the respective shaft supporters 26 are vertically disposed in parallel at both sides of the tilt screw 14, and simultaneously, may guide the upward and downward movement of the pan base 28 while penetratively supporting both sides of the pan unit, that is, penetratively supporting both end portions of the pan base 28.

Here, both ends of the shaft supporter 26 may be installed to be fixed to the wall 29 disposed on the base frame 20.

Various types of tilt units 15 may be implemented so as to be used for the suitable purpose, and for example, the tilt unit 15 may be a type in which the tilt unit 15 may be tilted at an upward angle in a case in which the support bar 18 to be described below is in a horizontal state, that is, a type in which the tilt unit 15 moves the nut 17 only upward based on the case in which the support bar 18 is in the horizontal state (see FIGS. 1 to 3).

Figure 7:
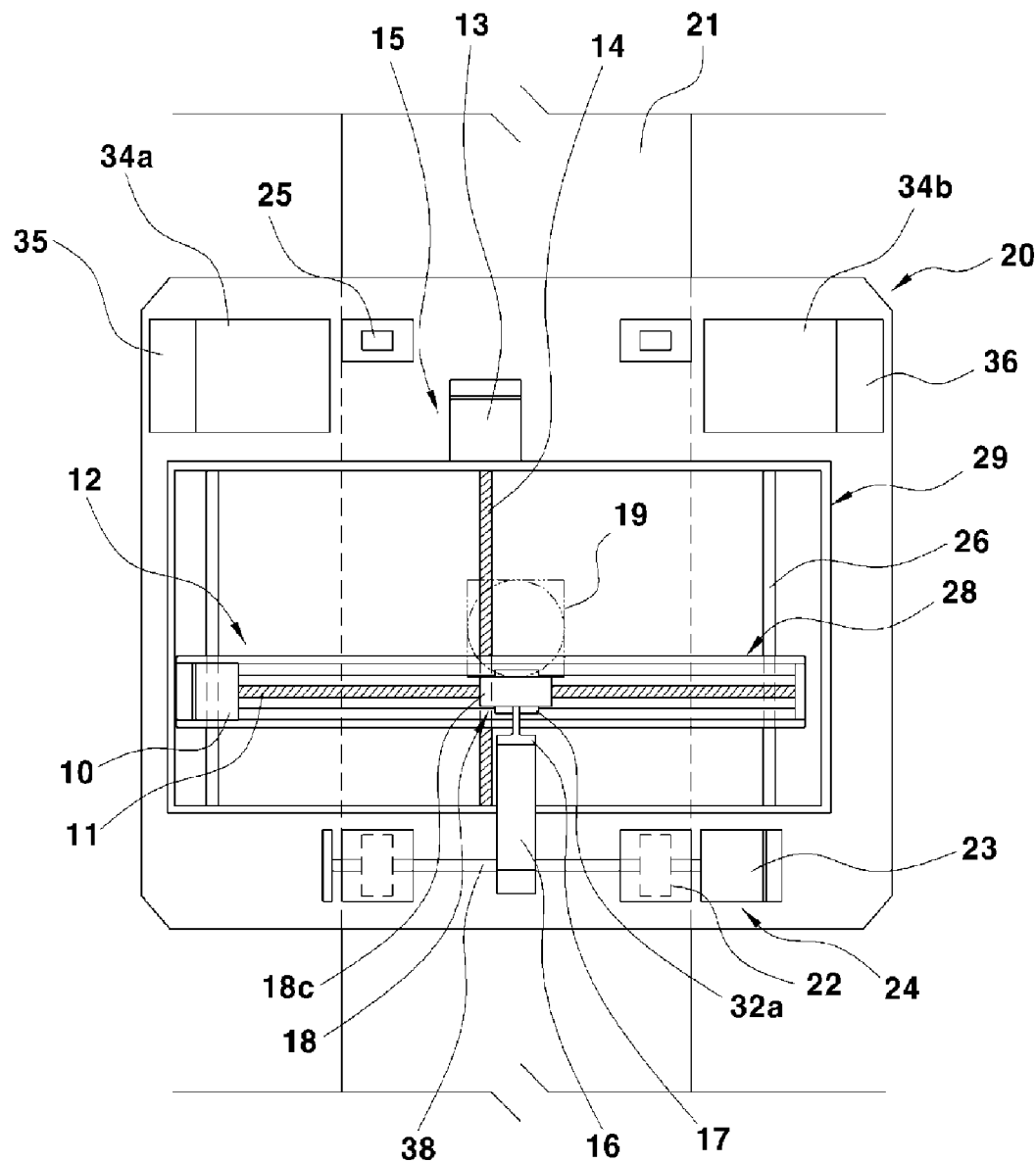
FIG. 7 is a front view illustrating a high-speed and high-resolution pan-tilt device according to another exemplary embodiment of the present invention.
Figure 8:
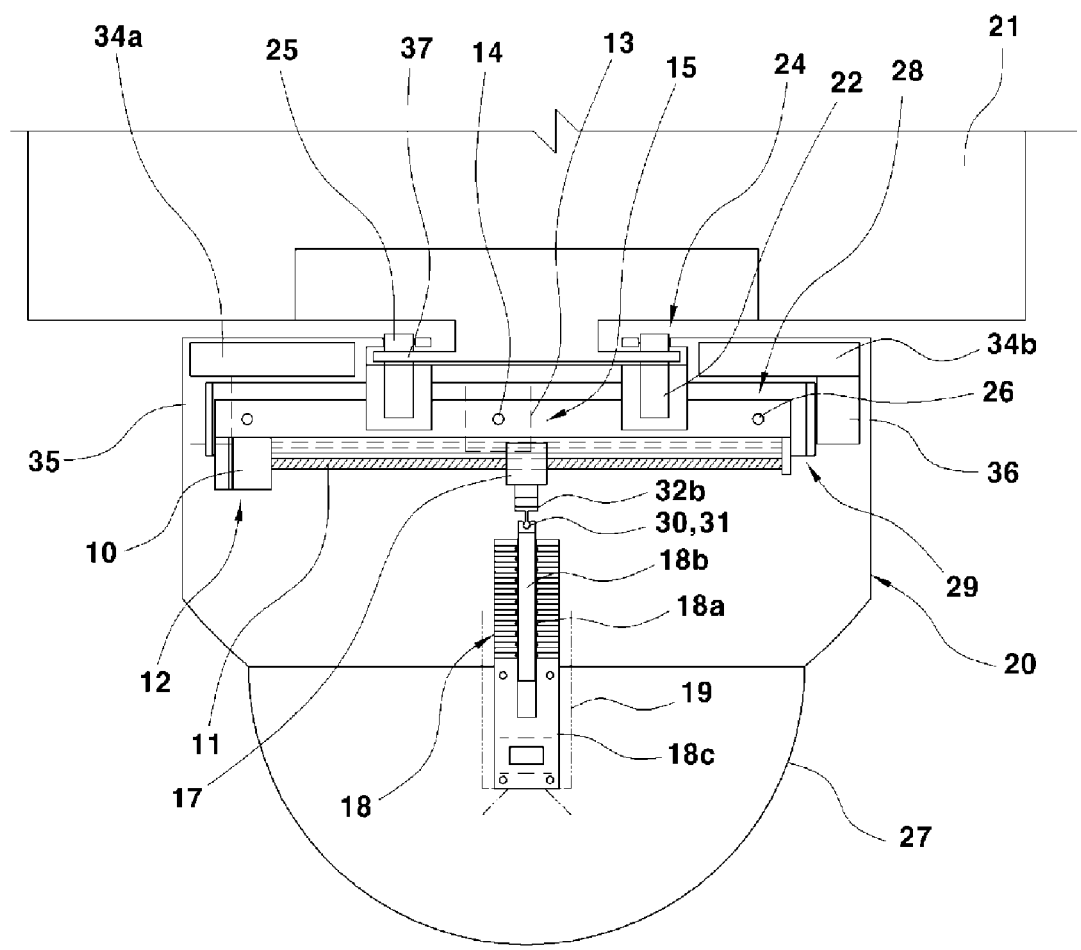
FIG. 8 is a top plan view illustrating the high-speed and high-resolution pan-tilt device according to another exemplary embodiment of the present invention.
Figure 9:
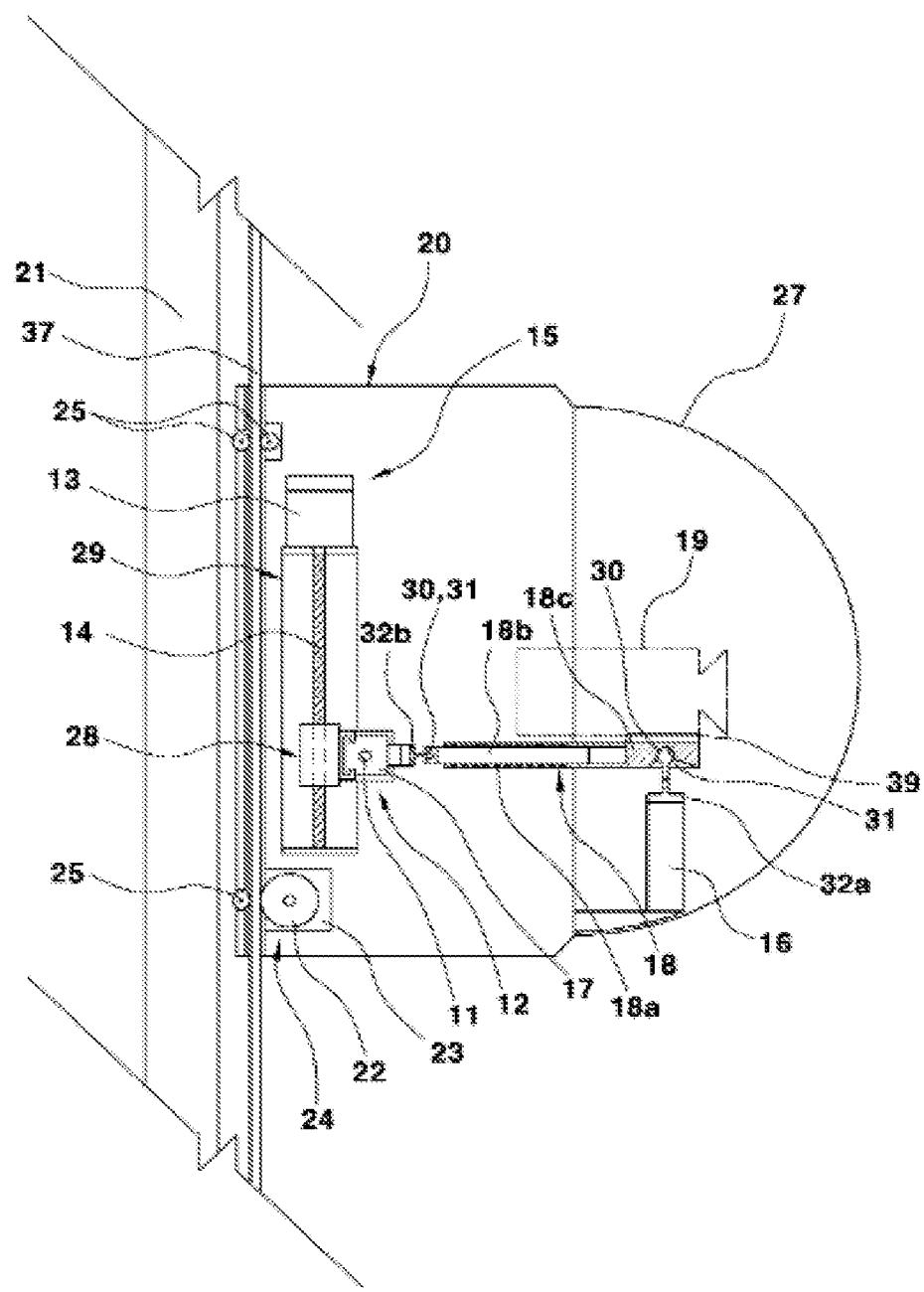
FIG. 9 is a side view illustrating the high-speed and high-resolution pan-tilt device according to another exemplary embodiment of the present invention.

As another type of tilt unit 15, the tilt unit 15 may be a type in which the tilt unit 15 may be tilted at upward and downward angles in the case in which the support bar 18 is in the horizontal state, that is, a type in which the tilt unit 15 moves the nut 17 upward and downward based on the case in which the support bar 18 is in the horizontal state (see FIGS. 7 to 9).

The support bar 18 is provided as a means for panning and tilting the camera 19 by substantially changing a left/right angle (angle in the horizontal direction) and an up/down angle (angle in the vertical direction).

The support bar 18 serves to support the camera 19, and adjust the left/right angle and the up/down angle of the camera 19 by changing postures (angles) by the pan unit 12 and the tilt unit 15.

To this end, a tip portion of the support bar 18 is fixedly supported on a supporter 16, which fixedly stands in a vertical posture, by means of a bearing structure, and the rear end portion of the support bar 18 is also supported on the nut 17, which moves along the pan screw 11 of the pan unit 12, by means of a bearing structure.

Here, as the bearing structure, a combination structure of a spherical ball 30 and a spherical ball groove 31, which are coupled to each other so as to be freely rotatable in any direction, may be adopted.

That is, a bracket 32a having the ball 30 is installed on an upper end portion of the supporter 16 that is installed in a vertical posture while being supported on an inner surface of a housing 27 that covers a front side of the base frame 20, and a bracket 32b having the ball 30 is also installed at a front side of the nut 17 that is coupled to the pan screw 11 of the pan unit 12 so as to transmit power in a screw manner.

Further, the ball grooves 31 are formed in a bottom surface of the tip portion of the support bar 18 and the rear end portion of the support bar 18, respectively, and the balls 30 of the respective brackets 32a and 32b are coupled and fitted to the ball grooves 31, which are formed as described above, such that the support bar 18 may be supported by the supporter 16 and the nut 17 so that both ends of the support bar 18 are rotatable, and with the coupling structures between the balls 30 and the ball grooves 31, it is possible to ensure that the support bar 18 may be smoothly moved at each support point when the posture of the support bar 18 is changed.

In particular, the support bar 18 has a structure in which a rod 18b and a housing 18c are combined by means of a bearing 18a, and when a left/right position and an up/down height of the rear end portion of the support bar 18 are changed, the rod 18b and the housing 18c may be accommodated and withdrawn relative to each other in a longitudinal direction of the bar to cope with the change in the left/right position and the up/down height, and as a result, an overall length of the support bar 18 may be changed.

Here, in addition to the manner in which the length of the support bar 18 is changed by the structure in which the rod 18b and the housing 18c are accommodated and withdrawn relative to each other, a slot structure may be used to cope with the changes in the left/right position and the up/down height of the rear end portion of the support bar 18.

Figure 4:
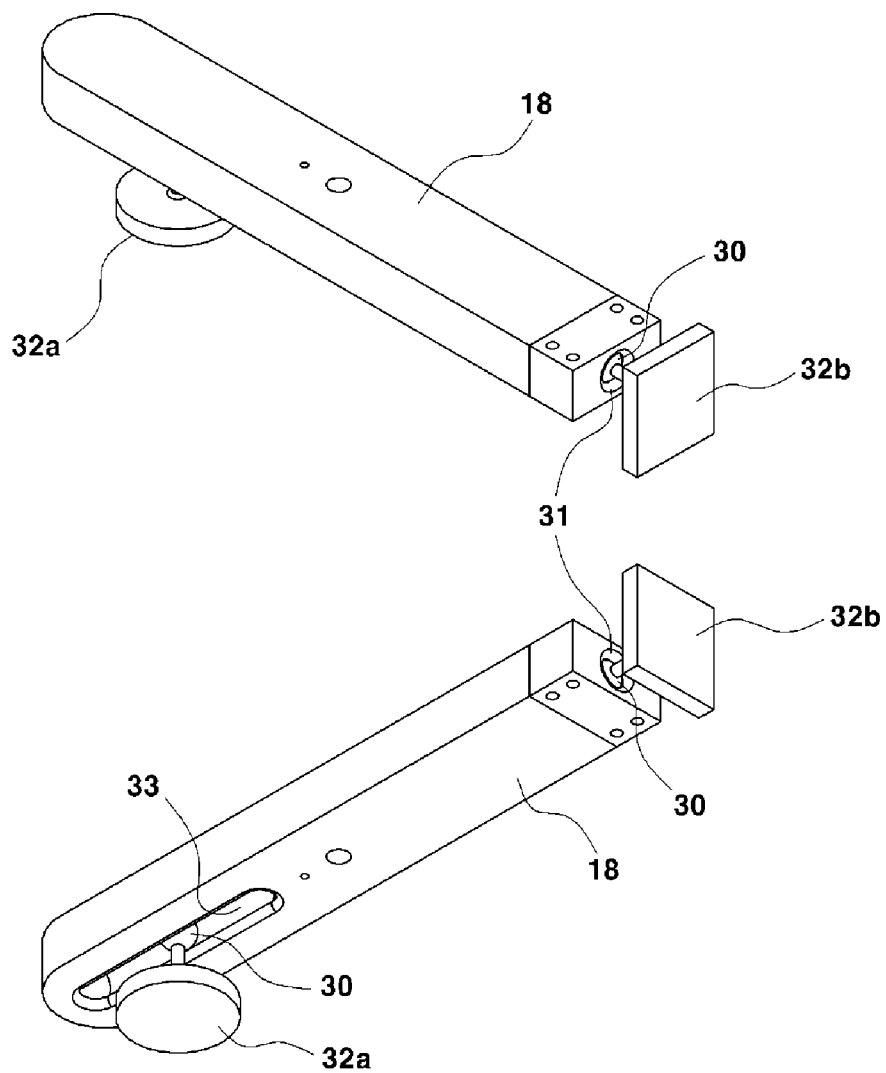
FIG. 4 is a perspective view illustrating a coupling structure between a camera supporter and a supporter bar of the high-speed and high-resolution pan-tilt device according to the exemplary embodiment of the present invention.

For example, as illustrated in FIG. 4, a slot 33, which is elongated in the longitudinal direction of the bar, is provided in the bottom surface of the tip portion of the support bar 18 formed in a single bar shape, and the ball 30 positioned in the bracket 32a of the supporter 16 is slidably fitted into the slot 33 provided as described above.

Therefore, when an angle of the support bar 18 is changed as the rear end portion of the support bar 18 moves, the ball 30 becomes relatively movable along the slot 33, and as a result, it is possible to cope with the changes in the left/right position and the up/down height of the rear end portion of the support bar 18.

The camera 19, which substantially tracks a target, is installed on an upper surface of the tip portion of the support bar 18, and in this case, a camera mount 39, which is mounted on the support bar 18 by means of a fastening structure, is used to fix the camera 19.

Therefore, the camera 19 may track the target while being panned and tilted in accordance with the change in posture of the support bar 18 due to the change in position of the rear end portion of the support bar 18.

In addition, a housing 27, which is made of a transparent material and has a semi-spherical shape, is coupled at a front side of the base frame 20, and with the housing 27 coupled as described above, components of the pan unit 12, components of the tilt unit 15, the camera 19, and the like, which are accommodated in the base frame 20, may be protected from the outside.

Further, as a means for supplying electric power or a means for various controls, PTU control boards 34a and 34b, a power connector 35, a PTU connector 36, and the like may be provided in the base frame 20.

Here, the power connector serves to supply and distribute electric power, the PTU control board refers to a control board that may control the pan-tilt device, and the PTU connector refers to a connector that may be connected to control the pan-tilt device from the outside.

In particular, as a means for changing a height to allow the camera to track the target and capture images, the present invention provides a vertical movement device 24 that includes a rail 21, main wheels 22, and a wheel driving motor 23.

To this end, the vertical rail 21 is installed on a wall of a building or a post, a height of the camera 19 may be adjusted as the camera is moved along the rail 21 installed as described above.

A rail plate 37 is formed on a front side of the rail 21, and in this case, the main wheels 22 and sub-wheels 25, which are positioned on the base frame 20, travel along both front and rear surfaces of the rail plate 37, and as a result, the entirety of the base frame 20 including the camera 19 may be moved in the vertical direction.

For example, a pair of main wheels 22 is disposed at a lower side of the base frame 20, and the both main wheels 22 disposed as described above are installed to be supported by a shaft of the wheel driving motor 23 and a power transmission shaft 38, and in this case, the main wheels 22 may travel on a front surface of the rail plate 37 positioned on the rail 21.

Here, a pinion-and-rack structure may be adopted to the main wheel and the rail plate.

Therefore, the main wheel 22 at both sides roll along the rail plate 37 while rotating when the wheel driving motor 23 is operated, and as a result, the base frame 20, which includes the camera 19 and the like, may be vertically moved in a longitudinal direction of the rail, thereby adjusting a height of the camera 19.

Further, a plurality of sub-wheels 25 are provided as a means for guiding the vertical movement of the base frame 20, and in this case, the respective sub-wheels 25 may be disposed at an opposite side to the main wheel 22 with the rail plate 37 disposed therebetween, and may roll along a rear surface of the rail plate 37 of the rail 21.

Two sub-wheels 25 may be disposed at both sides of the main wheel side, and two pairs of sub-wheels 25 may be provided on both sides of the front and rear surfaces of the rail plate 37 at an upper end of the base frame 20.

That is, a combination of the two pairs of sub-wheels 25 at an upper side and two pairs of a combination of the main wheels 22 and the sub-wheels 25 at a lower side are disposed on the front and rear surfaces thereof with the rail plate 37 disposed therebetween, and disposed to be in close contact with the front and rear surfaces of the rail plate, thereby serving to guide the movement of the pan-tilt device, and simultaneously, support the pan-tilt device to the rail side.

Therefore, with the combination of the two pairs of sub-wheels at an upper side and the two pairs of a combination of the sub-wheels and the main-wheels at a lower side, which form a quadrangular arrangement, the upward and downward vertical movement of the base frame may be stably carried out.

In this case, a motor, which is used to move the pan-tilt device in the vertical direction along the rail, may be configured to endure a load of the pan-tilt device, and to be prevented, by consistent stop torque at the time of a stop signal, from sliding.

Here, an encoder (not illustrated) for checking a position of the vertical movement may be mounted at one side of the shaft of the wheel driving motor 23 or at one side of the main wheel 22.

For example, the encoder is integrally installed at a front end of the motor or installed on a wheel shaft, thereby measuring a movement distance.

Therefore, an operating state of the high-speed and high-resolution pan-tilt device, which is configured as described above, will be described below.

Figure 5:
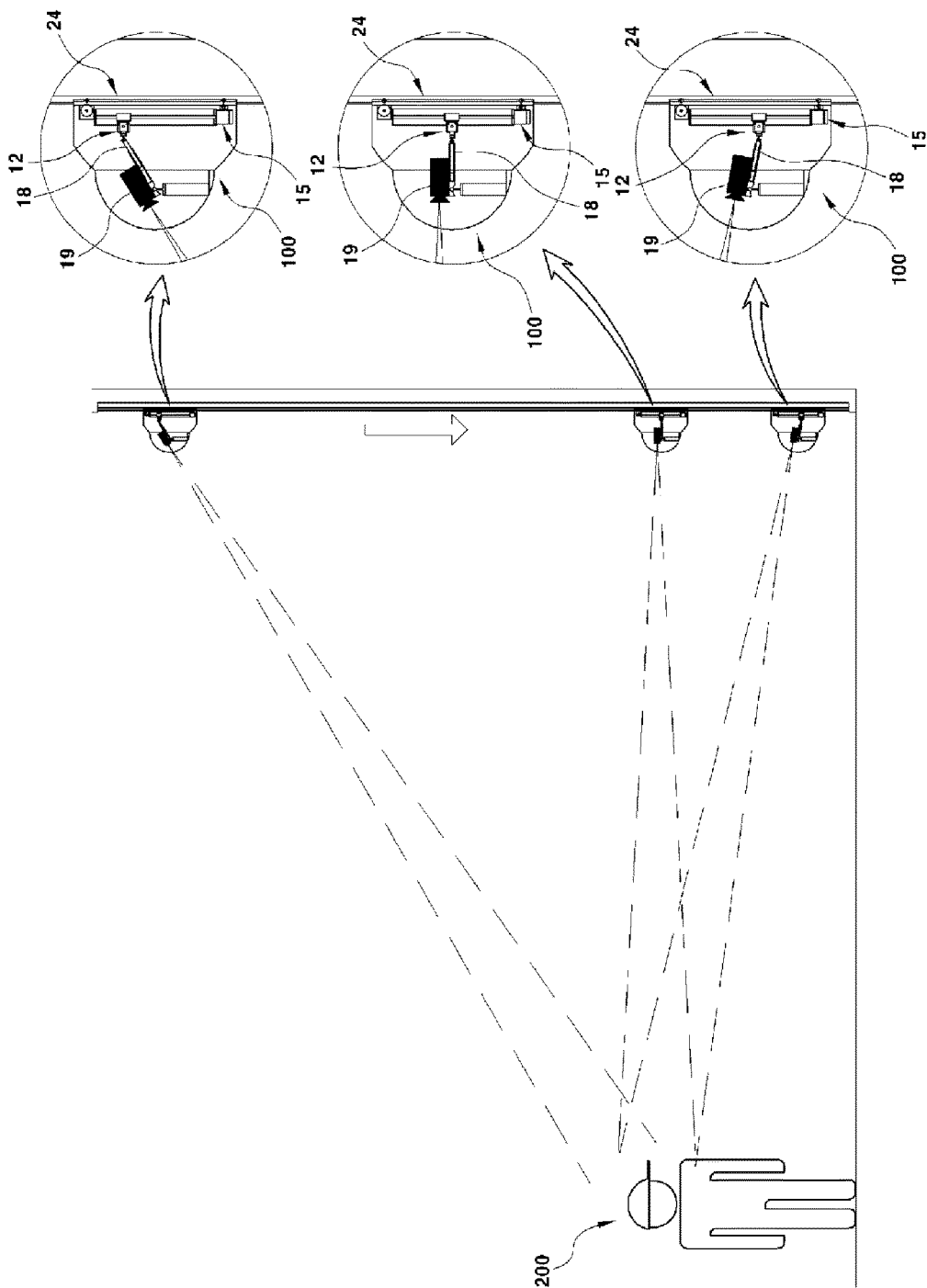
FIG. 5 is a side view illustrating an operating state of the high-speed and high-resolution pan-tilt device according to the exemplary embodiment of the present invention.
Figure 6:
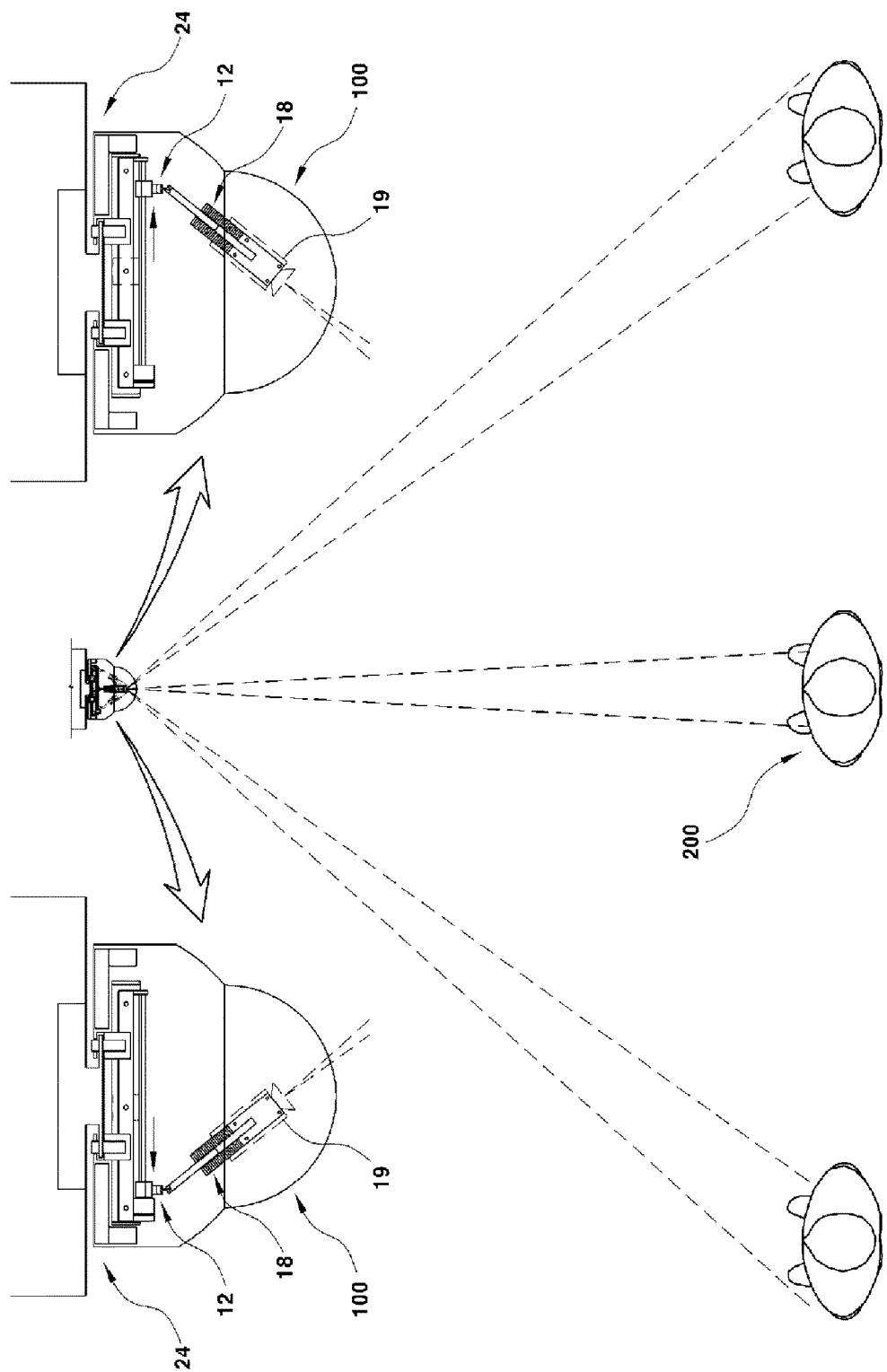
FIG. 6 is a top plan view illustrating an operating state of the high-speed and high-resolution pan-tilt device according to the exemplary embodiment of the present invention.

FIGS. 5 and 6 are a side view and a top plan view illustrating an operating state of the high-speed and high-resolution pan-tilt device according to the exemplary embodiment of the present invention.

As illustrated in FIGS. 5 and 6, when a target 200 such as a visitor or an intruder enters a region monitored by a pan-tilt device 100 that is in operation at all times, the camera 19 captures images while tracking the target 200 by connectional operations of the pan unit 12, the tilt unit 15, and the vertical movement device 24 of the pan-tilt device 100.

Here, various methods of automatically recognizing and tracking a moving target when the moving target is detected may be adopted without being particularly limited as long as the methods are typically known to the technical field.

For example, the camera may capture images while tracking the target by the connectional operations of the pan unit, the tilt unit, and the vertical movement device, which adopt a manner of operating a tracking camera, which is disclosed in Korean Patent Application Laid-Open No. 10-2012-0016479.

When the target 200 walks within a region to be monitored, the angle of the camera 19 is changed leftward and rightward by the operation of the pan unit 12, and the angle of the camera 19 is simultaneously changed upward and downward by the operation of the tilt unit 15, and at the same time, the height of the camera 19 is changed upward and downward by the operation of the vertical movement device 24, and as a result, the camera 19 captures images while tracking the target 200.

That is, since the rear end portion of the support bar 18 is moved leftward and rightward based on the tip portion used as a fixed point by the operations of the pan motor and the pan screw of the pan unit 12, the camera 19 is panned, and at the same time, since the rear end portion of the support bar 18 is moved upward and downward based on the tip portion used as a fixed point by the operations of the tilt motor and the tilt screw of the tilt unit 15, the camera 19 is tilted, and at the same time, since the entirety of the base frame is moved upward and downward by the operations of the motor and the wheel of the vertical movement device 24, the height of the camera 19 may be adjusted.

The operations of the pan unit 12, the tilt unit 15, and the vertical movement device 24 are connectionally carried out, and as a result, the camera 19 may capture images while tracking the target 200.

In this case, even in a case in which the target 200 moves slowly or rapidly, the target 200 wears a hat, or the target 200 is at a short distance or at a long distance, it is possible to move the camera (changing the angle of the camera) at a high speed and precisely control a pan-tilt angle by motor and screw control that enables precise/high-speed control, and as a result, it is possible to obtain precise image information of the target, and easily obtain data of a face of a person within a space to be monitored even in a case in which the person wears a hat or the face is hidden by an umbrella or the like.

Figure 10A:
FIGS. 10A and 10B are pictures illustrating a result of detecting a face using camera image information from the high-speed and high-resolution pan-tilt device according to the present invention.
Figure 10B:

For example, as illustrated in FIGS. 10A and 10B, a process of recognizing a hidden state, that is, a case in which the face is hidden by a hat, an umbrella, or the like will be described below.

In order to detect a face region, an algorithm, which searches for a form using an edge information from an image, or an algorithm, which uses information on skin color of the face, is used.

A result of detecting the face using the above algorithm will be described below.

To recognize an angle of the face and a hidden face after the face region is detected, information regarding eyes and lips is extracted.

Here, a triangular shape is formed when connecting points representing the eyes and the lips, and an angle of the face may be recognized from the above information, such that the device according to the present invention is moved downward as necessary (when the person lowers his/her head, or the person wears a hat).

In addition, the device according to the present invention moves downward even in a case in which the face is not detected even though there is a person who moves (when the person is under an umbrella).

Figure 11:
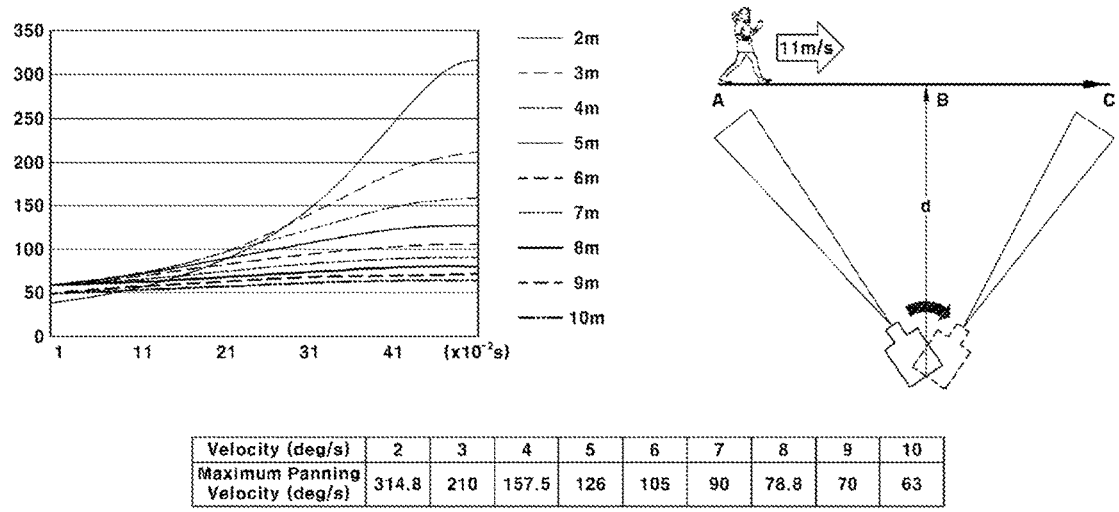
FIG. 11 is a schematic view for explaining a horizontal operation of a camera when the high-speed and high-resolution pan-tilt device according to the present invention performs a panning operation.

Further, as illustrated in FIG. 11, the panning operation refers to a horizontal operation of the camera that moves a camera mount head leftward and rightward to show a situation or a sight at both lateral sides.

Since the camera needs to track an object, which moves rapidly, without failing to track the object, the panning operation is an important factor for a technology for controlling a position of a security/surveillance camera.

FIG. 11 illustrates a maximum panning velocity of the camera while a person moves from point A to point C.

Since a panning velocity in a section where the person moves from point A to point B is identical to a panning velocity in a section where the person moves from point B to point C, only the section from point A to point B is considered in the present invention.

Assuming that a maximum movement speed of the person is 11 m/s while a distance d between the target and the camera is changed to 210 m, the maximum panning velocity is obtained by calculating the change of angle with respect to time for each distance as illustrated in the table in FIG. 11.

It can be seen that the maximum panning velocity is gradually decreased as the distance d between the target and the camera is changed from 2 m to 10 m.

In addition, it can be seen that the highest panning velocity of 314.8 deg/s is observed at point B at which the distance between the person and the camera is shortest.

Figure 12:
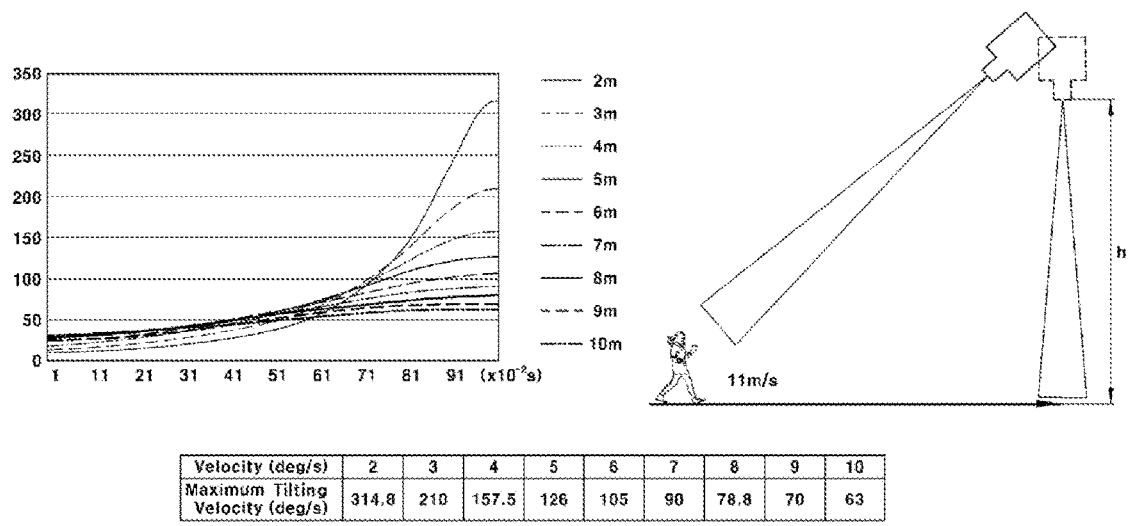
FIG. 12 is a schematic view for explaining a vertical operation of the camera when the high-speed and high-resolution pan-tilt device according to the present invention performs a tilting operation.

As illustrated in FIG. 12, the tilting operation refers to a vertical operation of the camera that moves the camera mount head upward and downward to show a situation at upper and lower sides thereof.

FIG. 12 illustrates a maximum tilting velocity of the camera while a distance between the target and the camera is changed to 210 m.

Assuming that the maximum movement speed of the person is 11 m/s while a height h between the target and the camera is changed to 210 m, the maximum tilting velocity is obtained by calculating the change of angle with respect to time for each distance as illustrated in the table in FIG. 12.

The initial tilting velocity of the camera increases as the height h increases, but the tilting velocity tends to gradually decrease as the person moves to point B.

While the person moves from point A to point B, the maximum tilting velocity of 314.8 deg/s is observed at point B at which the distance between the person and the camera is shortest.

As described above, the panning velocity and the tilting velocity, which are required to track the person, are calculated. As described above, the panning velocity and the tilting velocity are important for tracking the person who moves rapidly, and resolution of the panning and tilting operations is also important for tracking a person at a long distance, and for example, in order to consistently track a person who moves slowly at a distance of 100 m from the camera, the panning and tilting operations need to be carried out by very minutely changing an angle. In other words, a minimum rotation pitch of the panning and tilting operations needs to be very small.

As described above, the present invention implements a pan-tilt device that is capable of controlling a degree and a speed of changing an angle of the pan-tilt device in a high-precision and high-speed manner, and capable of adjusting an up/down height, and as a result, it is possible to obtain high-resolution images for identification, and obtain front face images for face recognition, thereby improving efficiency of a tracking/surveillance system that uses a camera.

The invention claimed is:

1. A high-speed and high-resolution pan-tilt device capable of changing a height comprising:
   a pan unit which includes a pan motor and a pan screw for rotating a camera leftward and rightward;
   a tilt unit which includes a tilt motor and a tilt screw for rotating the camera upward and downward, and moves the entirety of the pan unit upward and downward;
   a support bar which is a means for supporting the camera, and has a tip portion fixedly supported by a supporter by means of a bearing structure, and a rear end portion movably connected to a nut disposed on the pan screw by means of a bearing structure, wherein an angle and a length of the support bar are changeable when the camera is panned and tilted;

the camera which is mounted on the tip portion of the support bar, and is capable of being panned and tilted when an angle of the support bar is changed; and a base frame which supports the pan unit and the tilt unit.

2. The high-speed and high-resolution pan-tilt device of claim 1, further comprising:

a vertical movement device which is a means for adjusting a height of the camera, includes a rail that is vertically installed on a wall surface or a post, a main wheel that is installed on the base frame and rolls along the rail, and a wheel driving motor, and is capable of vertically moving the entirety of the base frame including the camera.

3. The high-speed and high-resolution pan-tilt device of claim 2, wherein the vertical movement device includes a sub-wheel which is disposed at an opposite side to the main wheel and assists the vertical movement while rolling along the rail.

4. The high-speed and high-resolution pan-tilt device of claim 2, wherein the tilt unit is a type in which the tilt unit is tilted at an upward angle in a horizontal state or a type in which the tilt unit is tilted at upward and downward angles in the horizontal state.

5. The high-speed and high-resolution pan-tilt device of claim 1, wherein the tilt unit is a type in which the tilt unit is tilted at an upward angle in a horizontal state or a type in which the tilt unit is tilted at upward and downward angles in the horizontal state.

6. The high-speed and high-resolution pan-tilt device of claim 1, wherein the support bar includes a combination of a rod and a housing which is capable of changing a length of the support bar while being accommodated and withdrawn relative to each other in a longitudinal direction by means of a bearing.

7. The high-speed and high-resolution pan-tilt device of claim 1, wherein the tilt unit includes shaft supporters which are disposed in parallel at both sides of the tilt screw and guide the upward and downward movement of the pan unit while penetratively supporting both sides of the pan unit.

8. The high-speed and high-resolution pan-tilt device of claim 1, further comprising:

a housing which accommodates the pan unit, the tilt unit, the support bar, and the camera, and covers a front side of the base frame.

9. The high-speed and high-resolution pan-tilt device of claim 1, wherein the support bar includes a combination of a rod and a housing which is capable of changing a length of the support bar while being accommodated and withdrawn relative to each other in a longitudinal direction by means of a bearing.

10. The high-speed and high-resolution pan-tilt device of claim 1, wherein the tilt unit includes shaft supporters which are disposed in parallel at both sides of the tilt screw and guide the upward and downward movement of the pan unit while penetratively supporting both sides of the pan unit.

11. The high-speed and high-resolution pan-tilt device of claim 1, further comprising:

a housing which accommodates the pan unit, the tilt unit, the support bar, and the camera, and covers a front side of the base frame.

\* \* \* \* \*